United States Patent [19]

Nakamura

[11] Patent Number: 5,287,441
[45] Date of Patent: Feb. 15, 1994

[54] METHOD AND APPARATUS FOR DISPLAYING A PARAMETRIC CURVE

[75] Inventor: Kazuo Nakamura, Itami, Japan

[73] Assignee: Mitsubishi Denki Kabushiki Kaisha, Tokyo, Japan

[21] Appl. No.: 593,452

[22] Filed: Oct. 5, 1990

[30] Foreign Application Priority Data

Oct. 12, 1989 [JP] Japan .................. 1-267029

[51] Int. Cl.⁵ .............................. G06F 7/00
[52] U.S. Cl. .................... 395/142; 395/141
[58] Field of Search ........... 395/140, 141, 142, 143; 340/747, 750, 728, 732

[56] References Cited

U.S. PATENT DOCUMENTS 5,182,795  1/1993  Boutaud et al. .............. 395/142
5,214,754  5/1993  Okamoto et al. .............. 395/142

*Primary Examiner*—Phu K. Nguyen
*Attorney, Agent, or Firm*—Townsend and Townsend Khourie and Crew

[57] ABSTRACT

In a method of drawing parametric curve on second-dimensional coordinate having discrete coordinate values, when rounding respective points on curve obtained by equal division in adjacent points, the nearest lattice point is not selected, but instead, if the incline value of this point is more than 1, an adjacent point containing integral X-coordinate is approximately computed, whereas if the incline value of this point is less than 1, an adjacent point containing integral Y-coordinate is approximately computed. Since specific lattice points nearest to the computed points are selected, smooth curve can be drawn without causing redundant point to occur at all. When executing linear interpolation, interpolation is executed by means of a straight line passing through the not-yet-rounded point without using such a line passing through the already rounded point. As a result, satisfactory linear interpolation very close to true curve can be achieved constantly.

18 Claims, 12 Drawing Sheets

METHOD AND APPARATUS FOR DISPLAYING A PARAMETRIC CURVE

BACKGROUND OF THE INVENTION

1. Field of the Invention

The present invention relates to a method of drawing parametric curve, more particularly, to a method of drawing parametric curve such as Bezier curve or B-spline curve expressed by cubic equation on the two-dimensional coordinate having coordinate value defined by discrete value.

2. Description of Related Art

When drawing either curves or straight lines with an apparatus for drawing two-dimensional plane composed of x and y axes, there are two methods of expressing coordinates of these axes. One of these is called "non-parametric curve" whose coordinates (x and y) are expressed in the form of f(x, y)=0. The other is called "parametric curve" whose coordinates are expressed in the form of x=g(t) and y=h(t), where t designates parameter.

Figure 1:
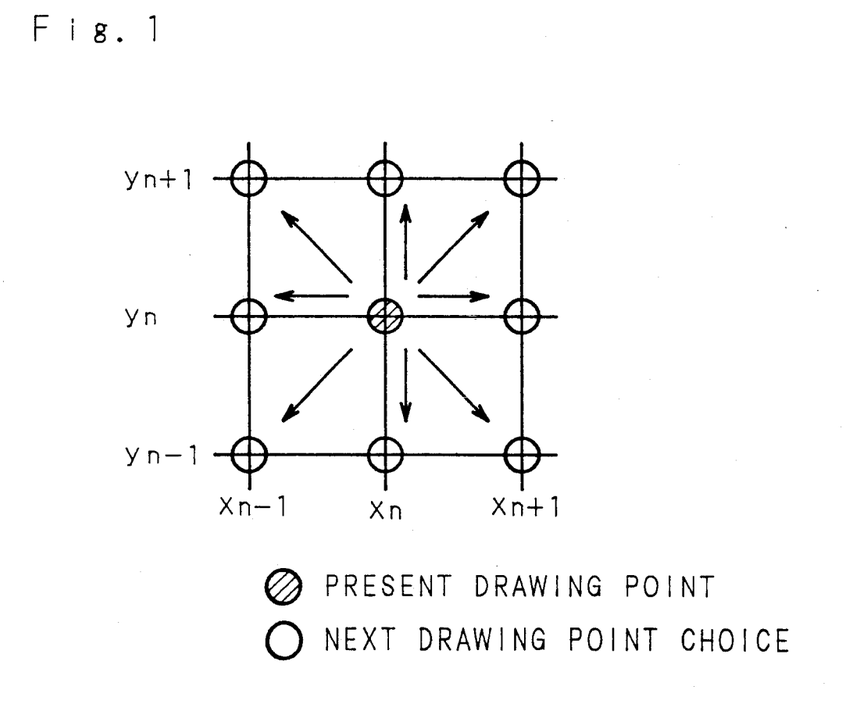
FIG. 1 illustrates the algorithm of Bresenham.

Nevertheless, data on the surface of an image-drawing apparatus like coordinate values on a CRT display or a printing paper for example are not defined as continuous values, but in many cases, these values are defined by means of integral discrete values. The image-drawing apparatus of this type does not need to fully compute coordinate value of curve, but it may solely compute coordinates (lattice points) of integral coordinate values on curves or adjacent points. In order to compute the coordinate for drawing non-parametric curve, there is a method called "algorithm of Bresenham". FIG. 1 illustrates the algorithm of Bresenham. As shown here, when computing the ensuing points after drawing certain points (xn, yn), in accordance with the predetermined evaluation method, an optimal point is selected from adjacent 8 points having values of coordinates x and y differing from each other by 1. When the apparatus follows up selection of the optimal point from the startup point to the end point, all the points needed for drawing curve can be secured. Nevertheless, this is hardly applicable to the parametric curve. This is because the coordinate values of the parametric curve are solely defined by function of parameter t. As a result, it is difficult for the above conventional method to determine lattice points having values of coordinates x and y differing from each other by 1. For example, the Bezier curve available for expressing outlines of characters and figures is defined by the form shown below.

$$x(t) = (-x_0 + 3x_1 - 3x_2 + x_3) \cdot t^3 + (3x_0 - 6x_1 + 3x_2) \cdot$$
$$t^2 + (-3x_0 + 3x_1) \cdot t + x_0 \quad (1)$$

$$y(t) = (-y_0 + 3y_1 - 3y_2 + y_3) \cdot t^3 + (3y_0 - 6y_1 + 3y_2) \cdot$$
$$t^2 + (-3y_0 + 3y_1) \cdot t + y_0$$

where ($0 \leq t \leq 1$) and $x_0$, $x_1$, $x_2$, $x_3$, $y_0$, $y_1$, $y_2$, and $y_3$, respectively designate coordinate values of four control points $(x_0, y_0)$, $(x_1, y_1)$, $(x_2, y_2)$, and $(x_3, y_3)$ determining the form.

Prior to the formation of this curve, the conventional apparatus needs to compute either Y-coordinate or X-coordinate having value x or y different from each other by 1 in correspondence with the incline at the objective coordinate. To compute either the Y-coordinate or the X-coordinate having the value x or y different from each other by 1, the apparatus needs to determine the value of parameter t by solving cubic equations related to x(t) or y(t), and then substitute the parameter value t into y(t) or x(t) before eventually computing y or x. Nevertheless, it takes much time to solve cubic equations, and thus, it is not ideal to spend much time merely for solving cubic equations when operating such an image drawing apparatus requiring extremely fast data-processing potential. Typically, there is a conventional method of drawing parametric curve disclosed in the Japanese Laid-Open Patent Publication No. 64-82282 of 1989. This method applies the algorithm of Bresenham to the drawing of Bezier curve, and thus, this method determines the parameter t by linear approximation in place of solving cubic equation.

This method is described below.

Figure 2A:
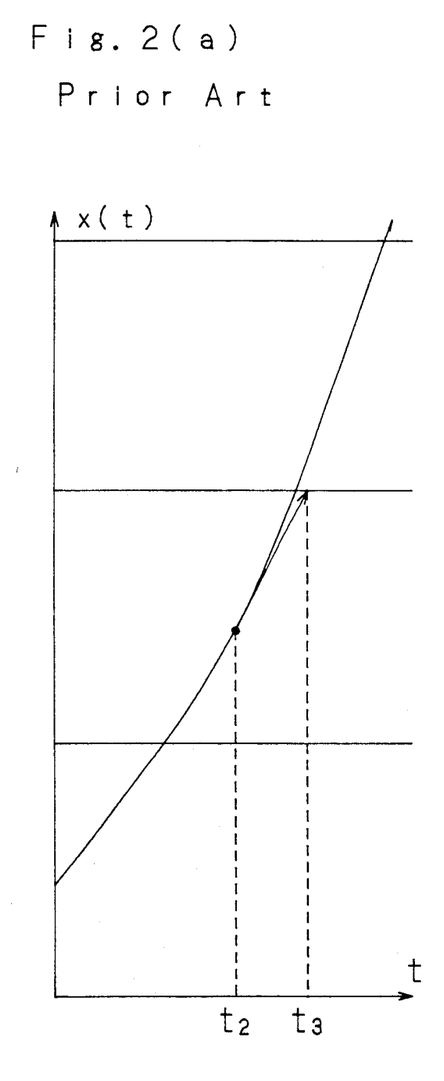
FIGS. 2 and 3 respectively illustrate conventional methods of drawing parametric curve.
Figure 2B:
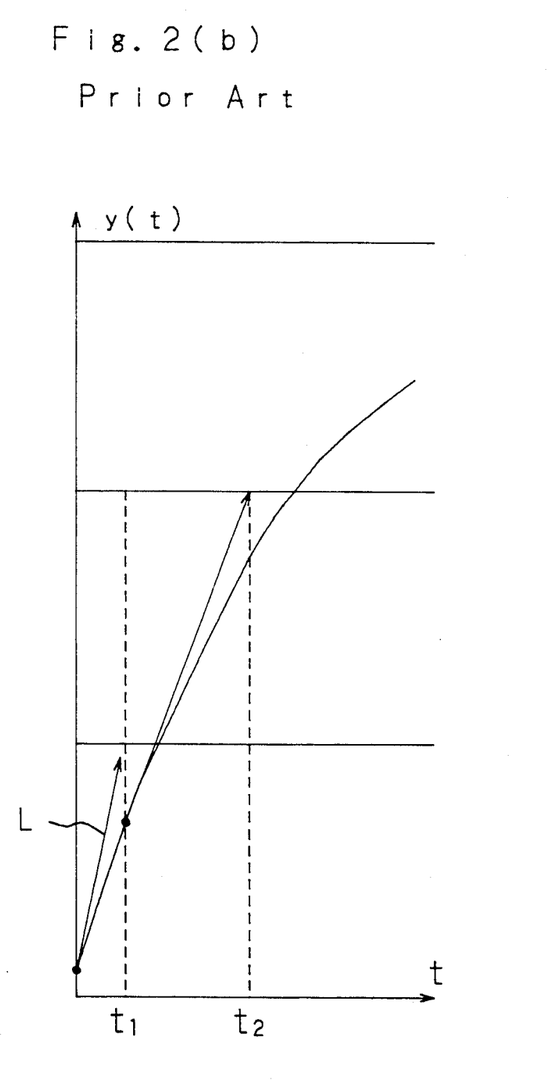
Figure 3:
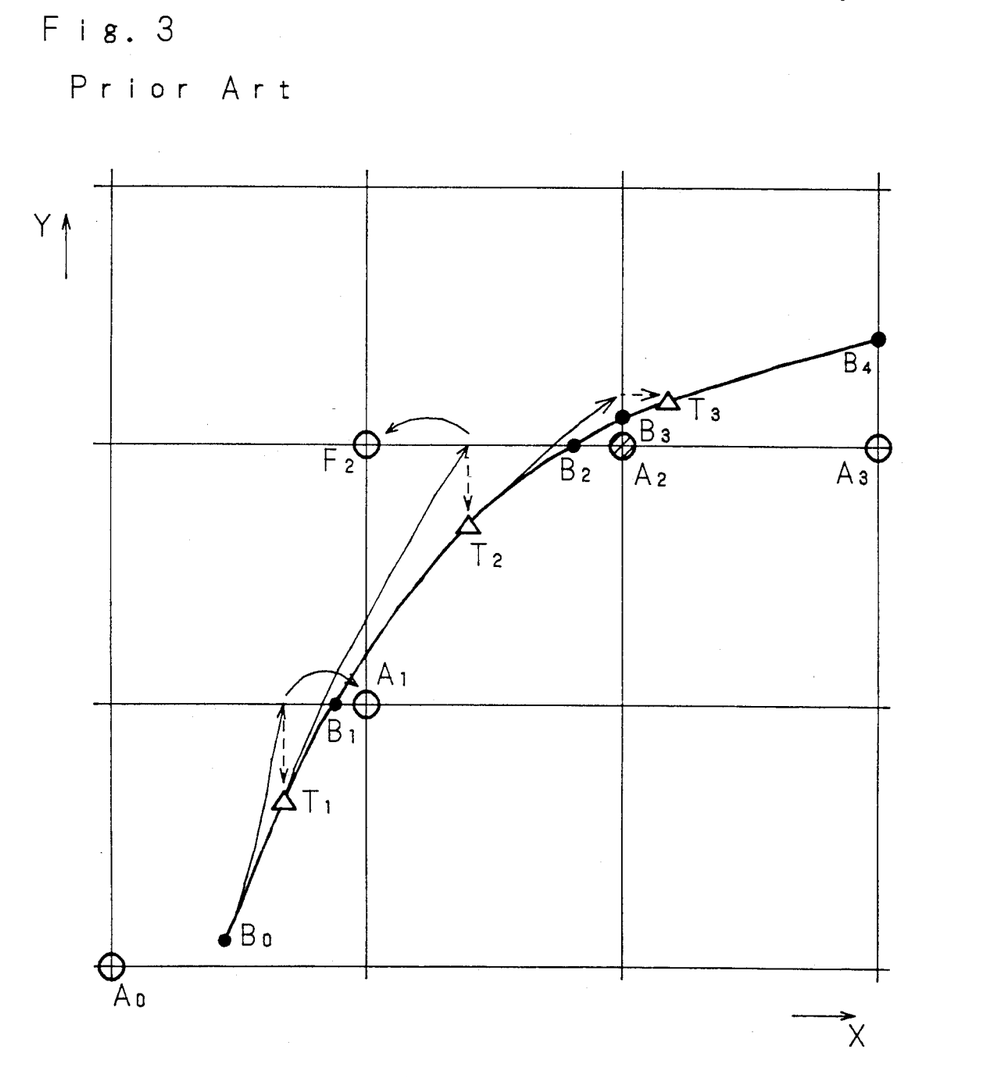

FIGS. 2 and 3 graphically illustrate the method mentioned above. In FIG. 2, the parameter t is designated on the axis of abscissa, whereas x(t) or y(t) is designated on the axis of ordinate. FIG. 2(a) illustrates x(t), whereas FIG. 2(b) illustrates y(t). FIG. 3 illustrates the curve-drawn pattern. The reference character B0 shown in FIG. 3 designates the drawing startup point. When logically and correctly applying the algorithm of Bresenham, those points B1 through B4 are taken into consideration for continuous drawing points. In addition, adjacent points A1, A2, and A3 are secured. Referring to the points B1 and B2, since the preceding points B0 and B1 respectively have specific incline values (differential coefficient of x against y) being more than 1, the coordinate value of y is integral. Conversely, since the incline value at the point B3 is less than 1, the coordinate value of x is integral at the point B4. On the other hand, according to the prior invention disclosed in the Japanese Laid-Open Patent Publication No. 64-82282 of 1989, if the incline value is more than 1, then y(t) shown in FIG. 2(b) is subject to linear approximation. If the incline value is less than 1, then x(t) shown in FIG. 2(a) is subject to linear approximation so that those points approximating the points B1, B2, and B3 can be yielded. On the other hand, the value $t_1$ of t is computed in order that the value of Y-coordinate at tangent L of y(t) at B0 (t=0) shown in FIG. 2(b) can become integer. Then, the point T1 shown in FIG. 3 in the condition of $t=t_1$ is specified as the point approximating B1. These sequential processes are repeated until points T2 and T3 are determined as points approximating B2 and B3.

Figure 4:
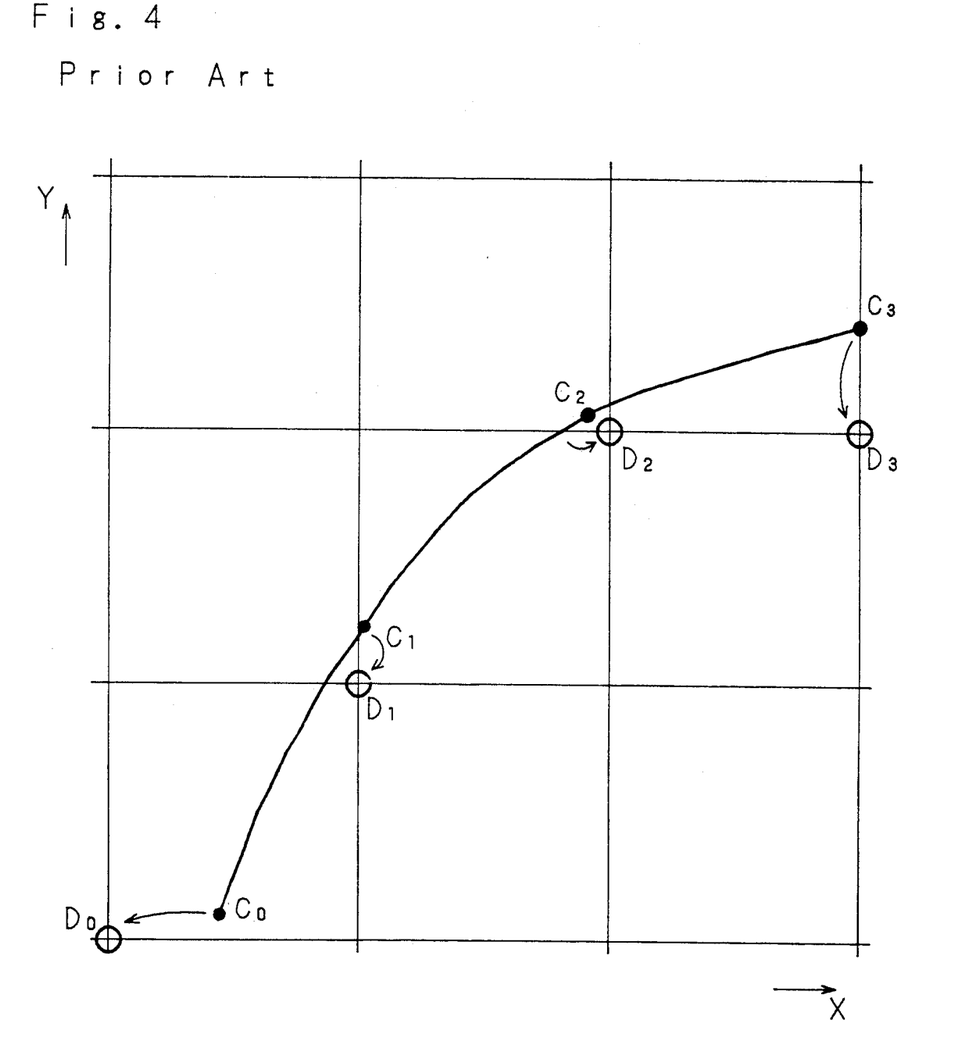
FIG. 4 illustrates another conventional method of drawing parametric curve.

Furthermore, there is a conventional method of drawing Bezier curve, which initially sets $\Delta t = \frac{1}{2}^n$ (where n designates positive integer), and then computes coordinates X and Y by incrementing the value of the parameter t from t=0 up to t=1 by the amount $\Delta t$ before specifying the nearest lattice points as the curve-drawing points x and y. FIG. 4 graphically illustrates this conventional method, in which C0, C1, ... are respectively the points on the curve corresponding to t=0, t=$\Delta t$, t=2$\Delta t$, and t=3$\Delta t$. D0, D1, ... respectively the rounded lattice points nearest to those points C0, C1, ... Cn.

Nevertheless, as is obvious from FIG. 3, because the former conventional method can hardly secure accuracy of approximation, T2 is too far from B2. In consequence, F2 is selected as the adjacent point instead of the lattice point A2 which is closest to the curve.

Figure 5A:
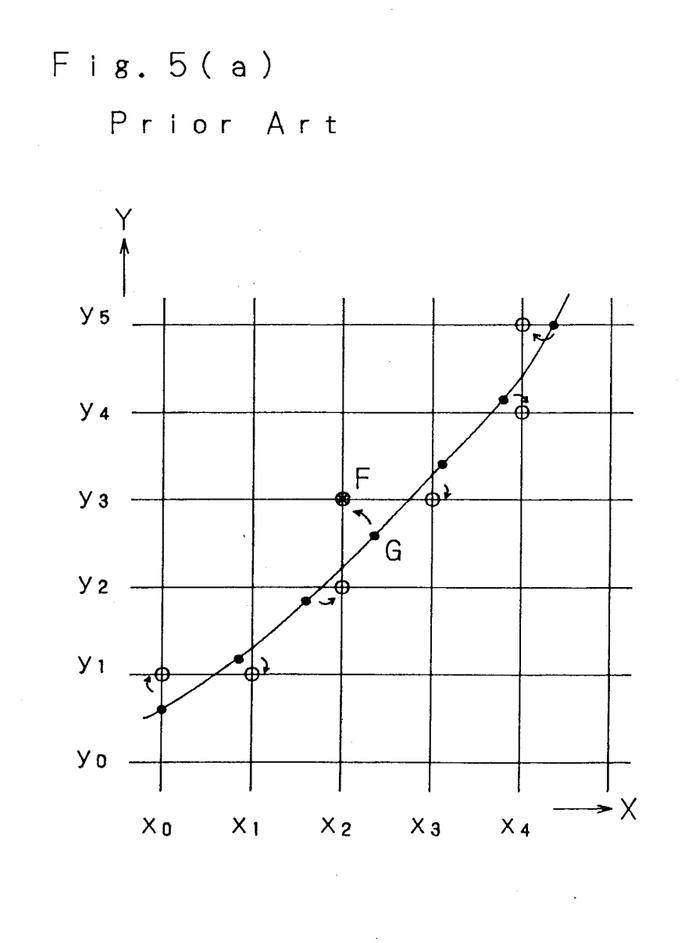
FIG. 5 illustrates problems arise from the conventional method of drawing parametric curve shown in FIG. 4.
Figure 5B:
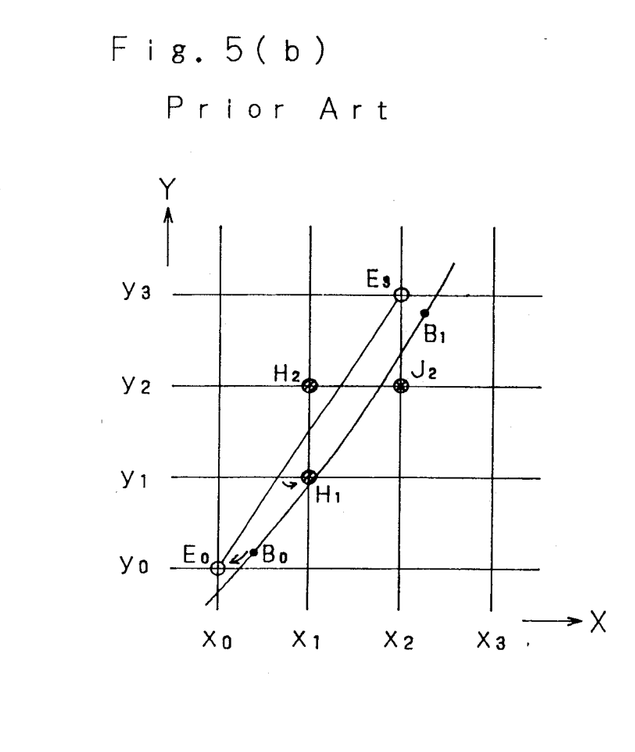

On the other hand, if $\Delta t$ is too small in the application of the later conventional method, redundant point is generated. FIG. 5(a) graphically illustrates the case in which a redundant point is generated. Black spots shown in FIG. 5 respectively designate those points on the Bezier curve, whereas white circles and circle F respectively designate rounded points. Although F is the lattice point closest to point G of the Bezier curve, the result of drawing is by far smoother when point F is deleted of drawing F. This is resulted from the method of selecting the nearest lattice point. Although the value of inclined curve is less than 1, two points are rounded on the identical coordinate $x_2$ and on the different coordinates $y_2$ and $y_3$. When applying this method, since the rounded points are not always adjacent to each other, in the event that these points are apart from each other, interpolation with a straight line is necessary. FIG. 5(b) graphically illustrates this example, in which $E_0$ and $E_3$ respectively designate the rounded drawing points, whereas $H_1$ and $H_2$ respectively designate points generated by the linear interpolation between $E_0$ and $E_3$. Substantially, $H_1$ and $H_2$ are the lattice points nearest to the straight line passing through $E_0$ and $E_3$. Nevertheless, as shown in FIG. 5, when applying this method $H_2$ has been selected for drawing curve instead in this case, instead that point $J_2$ which is nearer to the curve than the point $H_2$ should have been drawn.

In summary, the former conventional method cannot provide the curve with the nearest lattice point. On the other hand, the latter conventional method generates redundant point and cannot properly execute linear interpolation.

SUMMARY OF THE INVENTION

The invention has been achieved to fully solve those problems mentioned above. The primary object of the invention is to provide a novel method of drawing parametric curve like Bezier curve so that linear interpolation can correctly be executed without causing redundant point to occur at all.

To achieve the above object, according to the invention when drawing parametric curve and rounding those points generated by equal division of parameter t at the nearest lattice points, the nearest lattice point is not selected. If the incline value of these points exceeds 1, a certain adjacent point on the integral coordinate x is approximately computed. On the other hand, if the incline value of these points is less than 1, a certain adjacent point on the integral coordinate y is approximately computed, and then the nearest lattice point is selected at the computed point. When executing linear interpolation, interpolation is not applied to the straight line that passed through the already rounded points, but it is solely applied to the straight line passing through the not-yet-rounded points. In consequence, there is no possibility of selecting two drawing points in the direction perpendicular to the drawing direction, and thus, there is no fear of drawing redundant points. In particular, the linear interpolation is executed by applying the straight line which runs through the position nearest to the curve to be drawn.

The above and further objects and features of the invention will more fully apparent from the following detailed description with accompanying drawings.

DESCRIPTION OF THE PREFERRED EMBODIMENTS

Figure 6A:
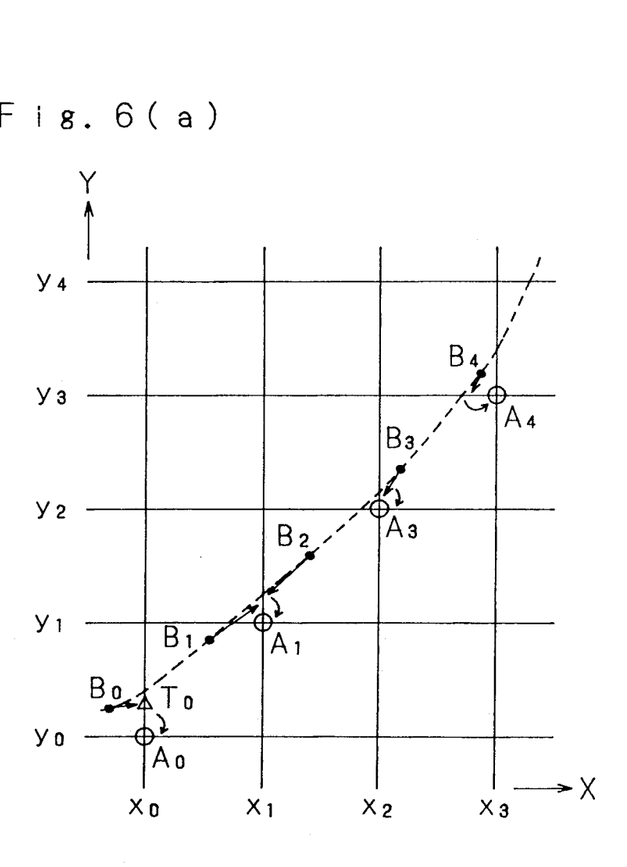
FIG. 6 illustrates the method of drawing parametric curve embodied by the invention.

Referring now to the accompanying drawings, an embodiment of the invention is described below. FIG. 6 illustrates the method of rounding the drawing points and the method of executing linear interpolation for embodying the method of drawing parametric curve related to the invention. In FIG. 6, the parametric curve subject to drawing is shown by broken line. The reference character $B_0$ shown in FIG. 6(a) designates the drawing startup point which corresponds to $t=0$. This point is rounded by execution of those serial processes described below. First, since the incline value of the curve at the drawing-startup point $B_0$ is less than 1, the drawing apparatus selects X-coordinate $x_0$ having the nearest integral coordinate value. Next, the drawing apparatus computes the crossing point $T_0$ between the tangent of the curve at the drawing startup point $B_0$ and the X-coordinate $x_0$. Next, the drawing apparatus selects lattice point $A_0$ which is nearest to the crossing point $T_0$ so that the lattice point $A_0$ can become the drawing point. In other words, the drawing apparatus approximately computes the nearest point having integral X-coordinate by executing linear interpolation before selecting the nearest lattice point. In this way, the drawing apparatus selects the lattice point $A_1$ as the point for drawing $B_1$ and $B_2$, the lattice point $A_3$ for drawing $B_3$, and the lattice point $A_4$ for drawing $B_4$, respectively. Since the incline value of the curve at the drawing point $B_4$ is more than 1, the drawing apparatus computes the crossing point between the tangent and the Y-coordinate $y_3$ at the drawing point $B_4$.

Figure 6B:
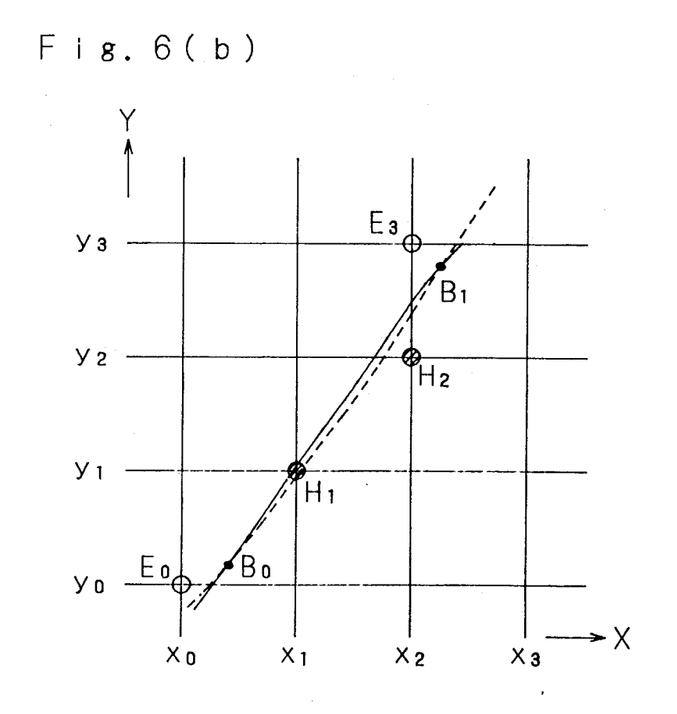

Next, by referring to FIG. 6(b), the method of executing linear interpolation with straight line is described below. The reference characters $E_0$ and $E_3$ shown in FIG. 6(b) respectively designate rounded drawing points, whereas $H_1$ and $H_2$ respectively designate the points for interpolating between the drawing points $E_0$ and $E_3$. In the embodiment shown in FIG. 6(b), instead of straight line passing through the drawing point $E_0$, another straight line passing through the drawing startup point $B_0$ prior to the rounding is available for the interpolation. As a result, the interpolation points $H_1$ and $H_2$ are substantially the lattice points nearest to straight line. At the same time, these lattice points are nearest to the curve to be drawn. The incline angle of straight line can be determined in order that the straight line can pass through the point $B_1$. Alternatively, the mean value between the incline of the curve at the drawing startup point $B_0$ and the incline of the curve at the point $B_1$ may also be applied.

Before describing the detail of the apparatus for embodying the method of drawing parametric curve related to the invention, mathematical background of the invention is described below. First, the method of computing the point coordinate on the Bezier curve is described below. In this example, it is assumed that the drawing apparatus computes those values under the condition in which the parameter t on the Bezier curve is either 0, or 1/16, or 2/16, or ... 15/16, or 1. Also, assume that $t=i/16$ in the Bezier curve shown in the first equation. Multiplication of x(t) by $2^{12}(=16^3)$ yields the second equation shown below.

$$2^{12}x(i) = (-x_0 + 3x_1 - 3x_2 + x_3) \cdot i^3 + \quad (2)$$
$$2^4(3x_0 - 6x_1 + 3x_2) \cdot i^2 +$$
$$2^8(-3x_0 + 3x_1) \cdot i + 2^{12}x_0$$
$$= a i^3 + b i^2 + c i + d$$

where
$a = -x_0 + 3x_1 - 3x_2 + x_3$
$b = 2^4 (3x_0 - 6x_1 + 3x_2)$
$c = 2^8 (-3x_0 + 3x_1)$ and
$d = 2^{12} x_0$.

Now, the third equation is given as $$2^{12}x(i) = \alpha(i) \quad (3)$$

Assume that the first, second, and the third differential coefficients related to "i" of $\alpha(i)$ to be $\alpha'(i)$, $\alpha''(i)$, and $\alpha'''(i)$. Based on this, the fourth equation is given as shown below.

$$\alpha(i+1) = \alpha(i) + \alpha'(i) + \alpha''(i)/2 + \alpha'''(i)/6 \quad (4)$$

$$\alpha'(i+1) = \alpha'(i) + \alpha''(i) + \alpha'''(i)/2 \quad (5)$$

Now, based on the sixth equation $$\alpha''(i) = 6ai + 2b, \, \alpha''' = 6a \quad (6)$$

the seventh, eighth, and the ninth equations are given as shown below.

$$\alpha(i+1) = \alpha(i) + \alpha'(i) + \alpha''(i)/2 + a \quad (7)$$

$$\alpha'(i+1) = \alpha'(i) + 2(\alpha''(i)/2) + 3a \quad (8)$$

$$\alpha''(i+1)/2 = \alpha''(i)/2 + 3a \quad (9)$$

Assume that, when $i=0$, initial values are respectively given as $\alpha(0)=d$, $\alpha'(0)=c$, and $\alpha''(0)/2=b$. If $\alpha'(i)+\alpha''(i)/2+a$, $2(\alpha''(i)/2)+3a$, and $3a$ are respectively added to those initial values whenever "i" is incremented by 1, the drawing apparatus can sequentially compute the values of $\alpha(i)$, $\alpha'(i)$, and $\alpha''(i)/2$. $\alpha(i)$ is the product of multiplication $x(i) \times 2^{12}$. Expression of this value in the binary digit corresponds to the result generated by the shift of x(i) to the left by 12 bits. In other words, after computing $\alpha(i)$, x(i) can be computed by shifting the decimal-point position to the left by 12 bits. The same is applied to x'(i) and x''(i).

Since those mathematical operations shown above can be achieved by executing multiplication and addition of 2, $2^4$, $2^8$, or $2^{12}$, if $x_0$, $x_1$, $x_2$, and $x_3$ are given in the form of integer, all the mathematical operations can be executed by applying addition and shift of integer. Even if $x_0$, $x_1$, $x_2$, and $x_3$ are given in the form of stationary decimal point having the decimal point, if these values are preliminarily shifted to the left and converted into integer and then mathematically processed before shifting the decimal-point position at the moment of taking x(i) into account, like the above case, all the needed computations can be executed merely by adding and shifting integer. For example, when $x_0$, $x_1$, $x_2$, and $x_3$, are given in the form of stationary decimal point having a maximum of 3 bits below the decimal point, the drawing apparatus shifts these values to the left by 3 bits, and then executes the above mathematical operations. When taking x(i) and x'(i) into consideration from $\alpha(i)$ and $\alpha'(i)$, consideration may be given to shift the decimal-point position to the left by 15 bits instead of 12 bits. In summary, by equally dividing the parameter t, the drawing apparatus can correctly determine the coordinate value of the Bezier curve merely by executing addition of integer and the shifting operation. The above description has solely referred to the X-coordinate. However, the same is applied to the Y-coordinate as well.

Figure 7A:
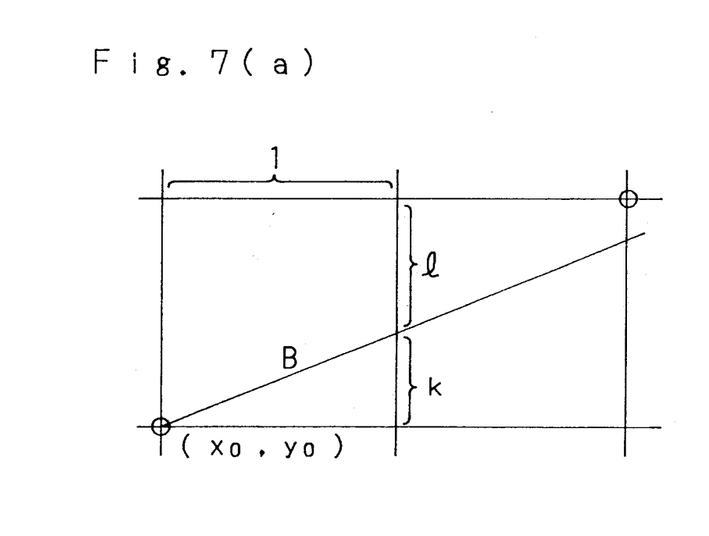
FIG. 7 illustrates the principle of linear interpolation embodied by the invention.

Next, the method of executing linear interpolation is described below. FIG. 7 illustrates the principle of the linear interpolation relative to the method of drawing parametric curve embodied by the invention. FIG. 7(a) illustrates a straight line which passes through the point $(x_0, y_0)$. The straight line upwardly extending to the right having the gradient dy/dx (where dy and dx are positive integers and where $dx > dy$) is correctly drawn by repeating those sequential processes described below. In this embodiment, "e" is defined to be $e=dx$ $(k-1)$. The initial value $e_1$ of "e" at the drawing startup point is assumed to be $e_1 = 2dy - dx$. Next, Y-coordinate of the next drawing point (where the X-coordinate is incremented by 1) is set by applying the value of "e". If the value of "e" is less than 0, then the apparatus selects the present Y-coordinate, and then adds 2dy to the present value of "e" to make up the next "e". If $e \geq 0$, then the apparatus selects the one obtained by adding 1 to the present Y-coordinate. Next, the apparatus adds 2dy−2dx to the present value of "e" to make up the next "e". In this way, by repeating these two sequential processes mentioned above, the straight line extending upward to the right can be drawn. If the straight line has more than −1 of the incline value and inclines itself downward to the right, and yet if $e \geq 0$, instead of adding 2dy−2dx, the apparatus adds 2dy+2dx. In this case, there is a relationship in which $dx > 0$ and $dy < 0$.

When drawing straight line to the left, the apparatus executes judgment and processes identical to the above case by retaining dx in the positive state, where the apparatus diminishes the value of the X-coordinate by 1 instead of incrementing it by 1. When drawing a straight line having more than 1 of the absolute value of the incline, the apparatus replaces the X-coordinate with the Y-coordinate to execute the identical logic, and then again replaces the X-coordinate with the Y-coordinate which are present on the drawing points when the straight line is drawn. These processes are described on pages 433 through 445 of the "Computer Graphics", published by Japan Computer Association.

Figure 7B:
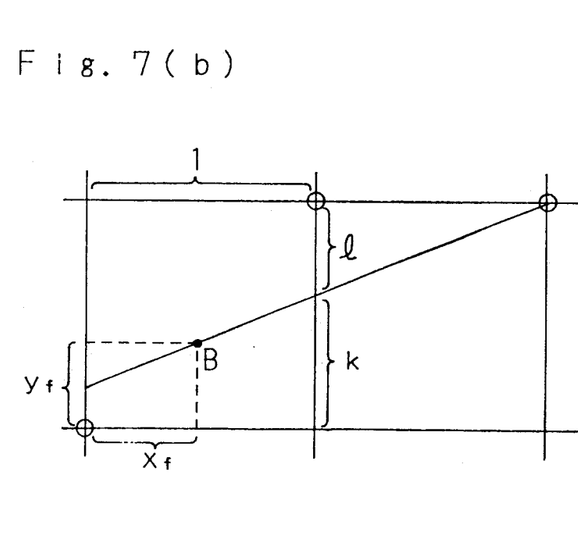

The reference character "e" shown above is the result from multiplication of the difference between distance "k" (between the true Y-coordinate of the straight line at the next drawing point and the present Y-coordinate), and "1" (between the true Y-coordinate and the coordinate obtained by adding 1 to the present Y-coordinate) by dx. As shown in FIG. 7(a), when computing the initial value $e_1$, straight line having the lattice point for starting the drawing is expressed according to the method mentioned above. However, as illustrated in FIG. 7(b), correction must be given to the straight line having point B being the point excluding the lattice point for starting the drawing where the correction is implemented as the equation shown below.

$$k = yf + (1 - xf) \, dy/dx$$

The initial value $e_1$ is computed by applying the equation shown below.

$$\begin{aligned} e_1 &= dx(k - l) = dx\{k - (1 - k)\} = dx(2k - 1) \\ &= dx\{2y(yf + (1 - xf)dy/dx) - 1\} \\ &= 2dx \cdot yf - 2dx \cdot xf + 2dy - dx \end{aligned}$$

In consequence, the initial value $e_1$ must be corrected by a specific amount corresponding to $2dx.yf - 2dy.xf$.

Next, the structure and operation of the parametric curve drawing apparatus for embodying the drawing method of the invention are described below.

Figure 8:
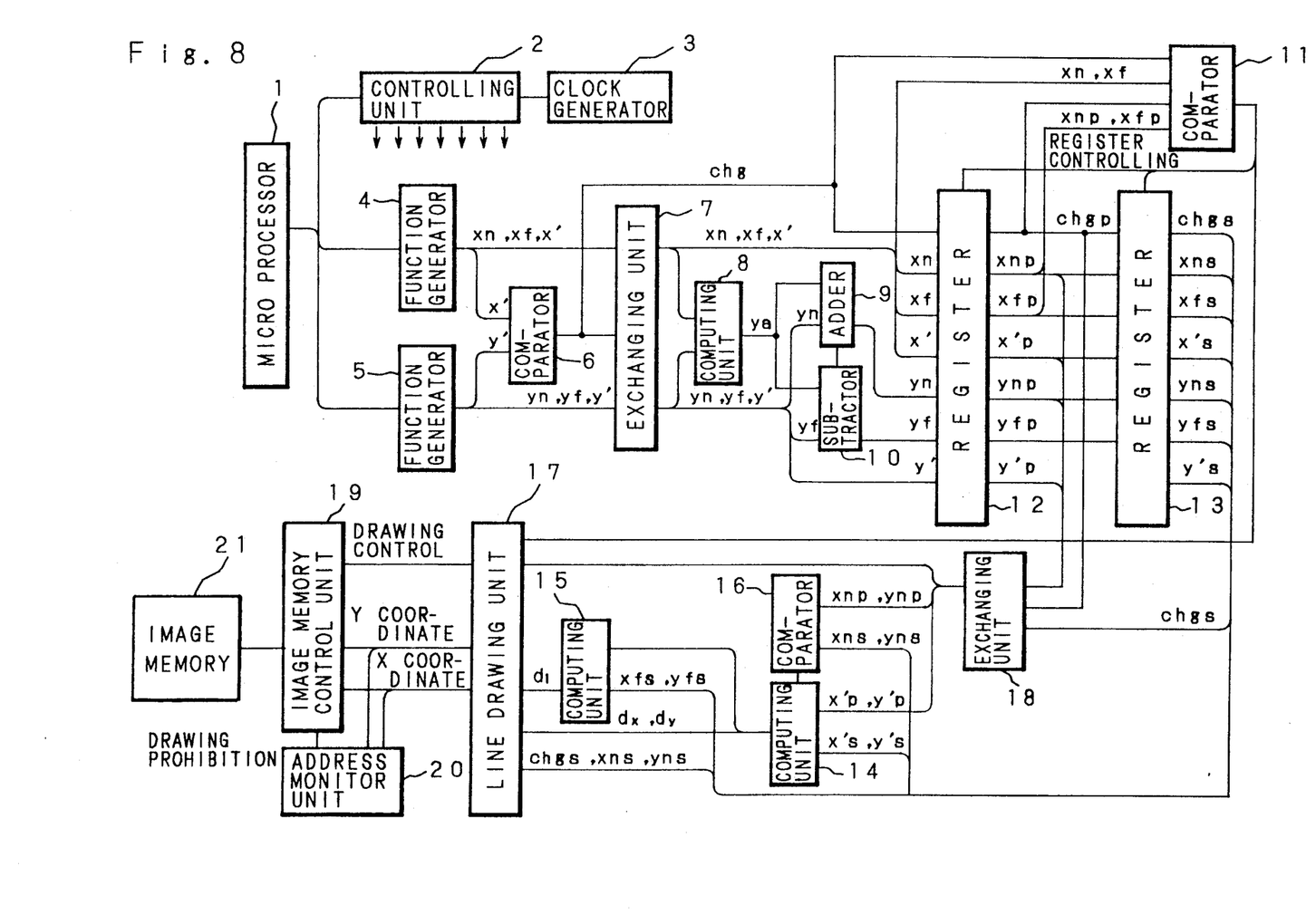
FIG. 8 illustrates the detailed block diagram of the parametric-curve-drawing apparatus for embodying the method achieved by the invention.

FIG. 8 illustrates the detailed block diagram of the parametric-curve drawing apparatus embodied by the invention. Integer and stationary decimal point used for the apparatus are expressed by complement of two. The reference numeral 3 designates clock generator. Generated clock pulse is delivered to control unit 2, which then generates control signal per cycle of clock for controlling hardware units except for microprocessor 1 and image memory 21 to be described later on.

Figure 9:
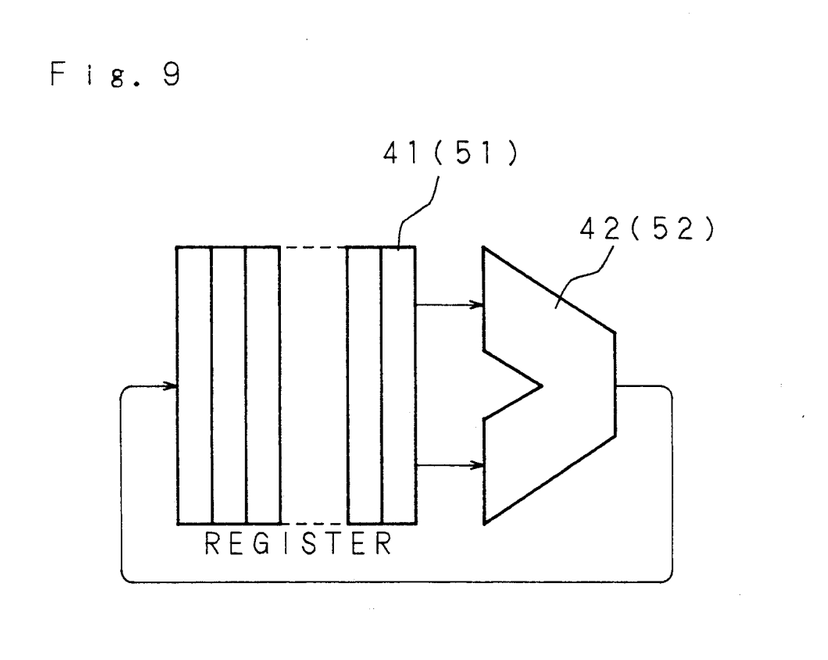
FIG. 9 illustrates the block diagram of the function generator provided for the parametric-curve drawing apparatus of the invention.

First, the microprocessor 1 determines constants a through d needed for generating function from four control points including $(x_0, y_0)$, $(x_1, y_1)$, $(x_2, y_2)$, and $(x_3, y_3)$ which respectively determine the form of Bezier curve. Next, the microprocessor 1 computes $\alpha(0)$, $\alpha'(0)$, $\alpha''(0)/2$, and $3a$, and then delivers these values to function generators 4 and 5 together with the constant "a". Simultaneously, the micro-processor 1 instructs the control unit 2 to start up the drawing of curve. Taking the subsequent processes into consideration, $\alpha(0)$ is defined to be $d + 2^{11}$, this value being preliminarily offset by $0.5 \times 2^{12}$. In this case, $x(t)$ and $y(t)$ respectively correspond to 0.5. FIG. 9 illustrates the schematic block diagram of the function generators 4 and 5, which are respectively composed of registers 41 and 51 and adders 42 and 52. The above addition is repeated in accordance with control signal from the control unit 2, and then sequentially generate $\alpha(0)$, $$\alpha'(0), \alpha''(0)/2, \alpha(1), \alpha'(1), \alpha''(1)/2, \ldots, \alpha(i),$$

$$\alpha'(i), \alpha''(i)/2, \ldots \alpha(16), \alpha'(16), \text{ and } \alpha''(16)/2.$$

Figure 10:
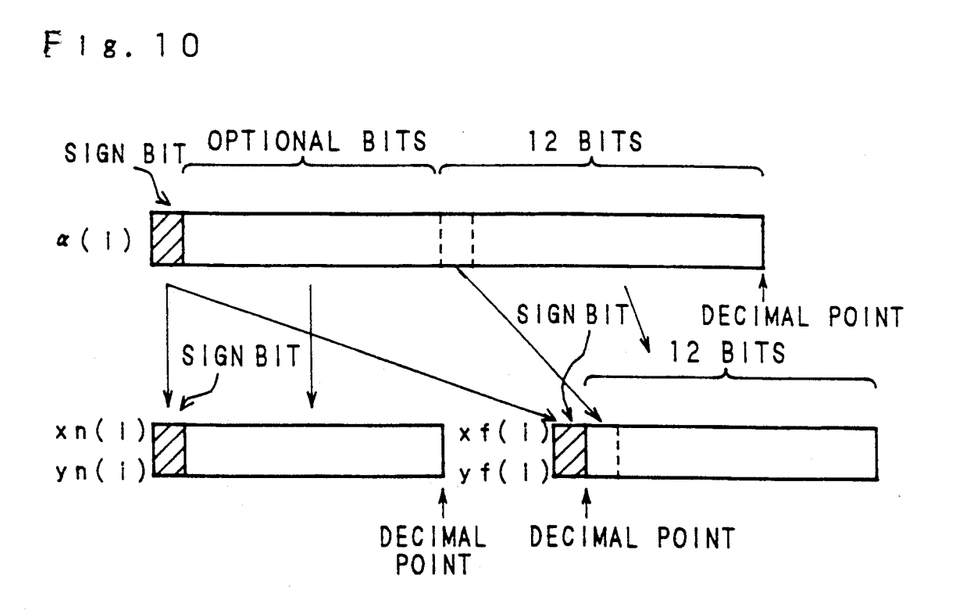
FIG. 10 illustrates the bit array output from the function generator shown in FIG. 9.

FIG. 10 illustrates bit array output from the functional generators 4 and 5. Since $\alpha(i)$ shifts decimal points of $x(i)$ or $y(i)$ to the left by 12 bits, as shown in FIG. 10, the decimal point of $x(i)$ or $y(i)$ can be divided into integer group $xn(i)$ or $yn(i)$ and also into below-decimal-point group $xf(i)$ or $yf(i)$. As mentioned above, since $\alpha(i)$ is preliminarily offset by $0.5 \times 2^{12}$, $xn(i)$ and $yn(i)$ can respectively become the integer nearest to $x(i)$ and $y(i)$. $xf(i)$ and $yf(i)$ respectively become the difference between $x(i)$ and $xn(i)$ and also between $y(i)$ and $yn(i)$. While executing the subsequent processes, the ratio of $x(i)$ and $y(i)$ always raises problem, and yet, since absolute value is not necessary, $\alpha'(i)$ is dealt as $x'(i)$ or $y'(i)$.

Comparator 6 compares values of $x'(i)$ and $y'(i)$. If there is a relationship $|y'(i)| > |x'(i)|$, in other words, if straight line inclines by an amount exceeding 1, then the comparator 6 outputs logic "1". Conversely, if this value is less than 1, the comparator 6 outputs logic "0" as chg(i). Exchanging unit 7 receives chg(i). If there is a relationship $|y'(i)| > |x'(i)|$, the exchanging unit 7 fully exchanges input signals by applying x and y. In other words, the exchanging unit 7 exchanges and outputs three pairs of data between $xn(i)$ and $yn(i)$, $xf(i)$ and $yf(i)$, and $x'(i)$ and $y'(i)$, respectively. When there is no relationship mentioned above, the exchanging unit 7 outputs $xn(i)$, $yn(i)$, $xf(i)$, $yf(i)$, $x'(i)$, and $y'(i)$, respectively.

In consequence, when there is a relationship $|y'(i)| > |x'(i)|$, the apparatus replaces the X-coordinate with the Y-coordinate in order to execute processes identical to the case in which a relationship $|y'(i)| \leq |x'(i)|$ is present. In FIG. 8, affix "i" is deleted from the signal expression.

Next, computing unit 8 checks coordinate $ym(i)$ of y in $x = xn(i)$. This is because not only $yn(i)$, but $yn(i) + 1$ and $yn(i) - 1$ may also be the integer nearest to $ym(i)$.

Figure 11:
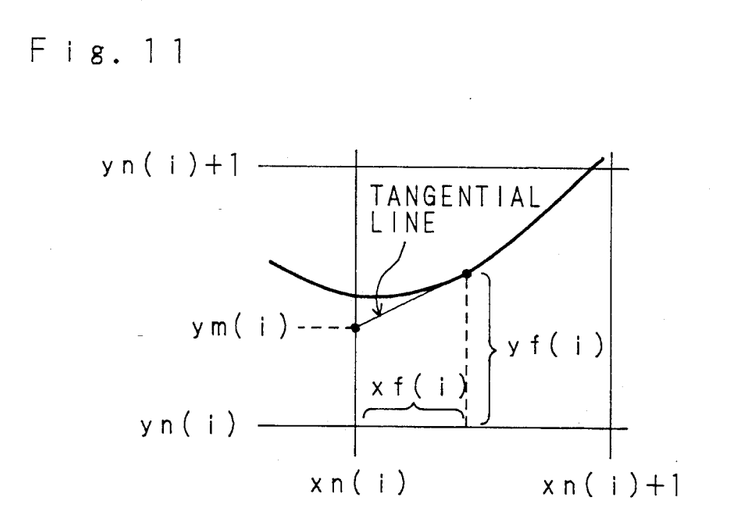
FIG. 11 illustrates the method of determining the point adjacent to the drawing startup point of the apparatus embodying the invention.

FIG. 11 illustrates the method of computing the point adjacent to the drawing startup point. As shown here, coordinate $ym(i)$ is computed by means of linear approximation based on the equation shown below.

$$ym(i) = yn(i) + yf(i) - \{y'(i)/x'(i)\} \times xf(i)$$

Because of the relationship $|y'(i)| \leq |x'(i)|$, when $yf(i) \geq 0$, the equation $ym(i) - yn(i) = yf(i) - \{y'(i)/x'(i)\} \times xf(i)$ is solved into the relationship denoted by $0.5 < ym(i) - yn(i) < 1$. When there is a relationship $yf(i) < 0$, this leads to the relationship denoted by $-1 < ym(i) - yn(i) < -0.5$. Next, the computing unit 8 computes the equation $ym(i) - yn(i) = yf(i) - \{y'(i)/x'(i)\} \times xf(i)$. If there is a relationship denoted by $yf(i) \geq 0$, then the computing unit 8 compares the result to 0.5. If there is a relationship denoted by $yf(i) < 0$, then the computing unit 8 compares the result to $-0.5$. If there is a relationship denoted by $ym(i) - yn(i) \geq 0.5$, then the computing unit 8 outputs "1". If there is a relationship denoted by $ym(i) - yn(i) < -0.5$, the computing unit 8 outputs "$-1$". If there is a relationship other than the above, the computing unit 8 outputs "0" as the value of ya. However, if the value of ya is other than "0", then the values of $yn(i)$ and $yf(i)$ must be corrected. Adder 9 and substractor 10 are provided for correcting these values. The adder 9 adds ya to $yn(i)$, whereas the substractor 10 substracts ya from $yf(i)$.

Next operation of comparator 11 and register 12 is described below. The comparator 11 control the register 12 in order that the register 12 can store those values including chg(i), xn(i), yn(i), xf(i), x'(i), and y'(i), when "i" is 0. The register 12 stores these values and then outputs corresponding data chgp, xnp, ynp, xfp, yfp, x'p, and y'p. When $i > 0$, the comparator 11 compares values of chg(i), xn(i), and xf(i) to the preceding values chgp, xnp, and xfp stored in the register 12.

Figure 12:
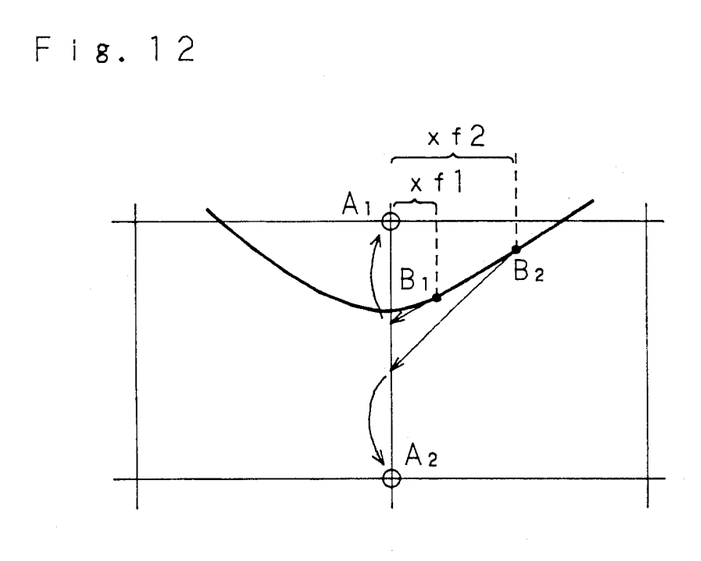
FIG. 12 illustrates the method of selecting more than two of the drawing points to be rounded on the identical coordinate axis of the apparatus related to the invention.

If the value of either chg(i) or xn(i) is different from those preceding values chgp or xnp, then register 13 stores the content of the register 12 and controls the register 12 so that the register 12 can store the values of chg(i), xn(i), yn(i), xf(i), yf(i), x'(i), and y'(i). The register 13 stores the content of the register 12 and then outputs values of chgs, xns, yns, xfs, yfs, x's, and y's. If the values of chg(i) and xn(i) are respectively equal to chgp and xnp, in other words, as shown in FIG. 12, if the incline is of the identical degree and the drawing points is rounded at the position identical to the preceding one, then the comparator 11 compares the absolute values of xf(i) and xfp and then controls the register 12 in order that the register 12 stores values of chg(i), yn(i), yf(i), xn(i), and yn(i) if the absolute value of xf(i) is less than that of xfp. Conversely, if the absolute value of xf(i) is more than the other, no control is applied because these values are preliminarily stored. FIG. 12 illustrates the method of selecting more than two of drawing points to be rounded on the identical coordinate axis. If the value of chg remains identical and a plurality of points to be rounded on the same xn are present, as shown in FIG. 12, only the point B1 nearest to xn is selected, whereas the other point B2 is ignored. The register 13 stores data of the rounded drawing points.

Line drawing unit 17 is described below. Whenever the register 13 stores the content of the register 12, availing of the output yns and xns as the drawing startup points, the line drawing unit 17 draws a straight line covering and by the number of points having difference whichever the greater between points xns and xnp or points yns and ynp. While the drawing process is underway, computing unit 14 provides the line drawing unit 17 with incline by computing the values of dx and dy from those equations shown below.

$$dx = x's + x'p$$

$$dy = y's + y'p$$

The computed values of dx and dy are made available for the approximate mean values of the incline of Bezier curve at both ends of the straight line to be drawn. Simultaneously, the computing unit 15 computes the initial value of "e" based on the equation shown below.

$$e_1 = 2dx \cdot yfs - 2dy \cdot xfs + 2dy - dx$$

The computed initial value "e" is then delivered to the line drawing unit 17. Simultaneously, the comparator 16 compares the value of yns to that of ynp. If both values are equal to each other, the comparator 16 outputs control signal to the computing unit 14 to reduce the value of dy to zero. This prevents the drawn line from meandering itself when performing linear interpolation by applying a horizontal straight line. Based on those processes mentioned above, the line drawing unit 17 generates coordinates of the drawing points, and then delivers these coordinates to image memory controller 19. If the value of chgs is zero, the line drawing unit 17 outputs both the X and Y coordinates without replacing them. If the value of chgs is 1, then the line drawing unit 17 outputs both coordinates after replacing them with each other.

Address monitoring unit 20 constantly watches both the X and Y coordinates. If the coordinate values are identical to those which were drawn immediately before, the address watching unit 20 outputs drawing inhibit signal to the image memory control unit 19. This signal is outputted when only the value of chg varies. Finally, whenever data of the X and Y coordinates are delivered, the image memory control unit 19 computes address of the point shown on image memory 21, and then draws line on the image memory 21.

The comparator 18 is substantially the exchanging unit which replaces xnp with ynp and x'p with y'p when the values of chgs and chgp are different from each other.

The above embodiment presents an example of equal division of the range of $0 \leq t \leq 1$ into the sixteen as the coordinates of line-drawing points. However, it is not always necessary to divide the range into sixteen. For example, if there are short intervals between control points $(x_0, y_0)$, $(x_1, y_1)$, $(x_2, y_2)$, and $(x_3, y_3)$, less than sixteen-division can be executed. Conversely, if the intervals between these control points are wide, unless division being finer than sixteen-division is executed, error generated from the linear interpolation will become significant.

The foregoing description has referred to the embodiment of the invention by way of dealing with all the effective bits of xf(i), yf(i), x'(i), and y'(i). Nevertheless, even when only the upper bits are computed by deleting the lower bits, the result of the drawing cannot adversely be affected.

The above description has solely referred to the example of drawing Bezier curve. However, the scope of the invention is applicable to the entire parametric curves. For example, as was described on the case of Bezier curve, those processes described in the above specifications are also securely applicable to B-spline curve, in which parameter "t" of the X and Y coordinates are expressed by the cubic equations shown below.

$$6x(t) = (-x_0 + 3x_1 - 3x_2 + x_3) \cdot t^3 + (3x_0 - 6x_1 + 3x_2) \cdot \quad (10)$$
$$t^2 + (-3x_0 + 3x_2) \cdot t + (x_0 + 4x_1 + x_2)$$

$$6y(t) = (-y_0 + 3y_1 - 3y_2 + y_3) \cdot t^3 + (3y_0 - 6y_1 + 3y_2) \cdot$$
$$t^2 + (-3y_0 + 3y_2) \cdot t + (y_0 + 4y_1 + y_2)$$

where $(0 \leq t \leq 1)$: $x_0, x_1, x_2, x_3, y_0, y_1, y_2$, and $y_3$, are respectively the coordinate values of the form-determining points of $(x_0, y_0)$, $(x_1, y_1)$, $(x_2, y_2)$, and $(x_3, y_3)$.

In this case, in order to determine x(t) and y(t), division by six is necessary. This division can be done by preliminarily dividing $x_0, x_1, x_2, x_3, y_0, y_1, y_2$, and $y_3$, by six. Alternatively, another computing unit for executing the above division by six may be added to the output terminals of the function generators 4 and 5 shown in FIG. 8.

Although the above embodiment defines the basic unit "u" to be 1, the invention does not solely confine the basic unit "u" to be 1, but it can also be composed of any real-number value as well.

As is clear from the above description, according to the invention, when drawing parametric curve, in particular, when rounding those points on a curve generated by equal division of parameter "t" into adjacent lattice points, the apparatus does not select the nearest lattice points, but instead, when the incline of these nearest lattice points is more than 1, adjacent points having integral X-coordinate are approximately computed. Conversely, if the incline value of these nearest points is less than 1, adjacent points having integral Y-coordinate are approximately computed, and then the apparatus eventually selects those lattice points nearest to the computed points. By virtue of this method, very smooth curve can be drawn without causing redundant points to occur. When executing linear interpolation, interpolation is not executed by applying a straight line passing through the rounded points, but instead, it is executed by applying a straight line passing through the not-yet-rounded points. In consequence, the invention provides an extremely useful method capable of achieving interpolation very close to the true curve.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A method of displaying a representation of a parametric curve in a two-dimensional space where a location of a point in the two-dimensional space is specified uniquely by an x coordinate and a y coordinate, the parametric curve being a representation of all points with x and y coordinates satisfying a first equation, $x=f(t)$, and a second equation, $y=g(t)$, for at least one value of t, t being a real number within a predetermined range bounded by a first t value and a last t value, where f and g represent predetermined functions of t, said method comprising steps of:

determining a resolution of an output device such that each point capable of being displayed as a mark by said output device is representable by an x coordinate value which is an integer multiple of a distance u and a y coordinate value which is an integer multiple of a distance v;

selecting a display color;

selecting a plurality of t values, each within the predetermined range;

identifying, for each t value of said plurality of t values, a grid point of said output device, comprising the steps of:

calculating a location of an actual point specified by an x and a y coordinate which satisfy the first and second equations, respectively, for said t value;

locating a grid line described by a third equation, $x=p*u$, when an absolute value of a derivative of $g(t)$ with respect to $f(t)$ at said t value is less than one and described by a fourth equation, $y=q*v$, when said absolute value is greater than one, wherein p and q are integers resulting from rounding said x and y coordinates of said actual point to nearest integer multiples of u and v, respectively;

locating a cross point, said cross point being an intersection of said grid line and a tangent to the parametric curve, where said tangent passes through said actual point; and locating a grid point, said grid point being a point on said grid line nearest said cross point, wherein grid points are characterized by x and y coordinates which are integer multiples of u and v, respectively; and sending a signal to said output device, said signal instructing said output device to show each grid point identified in said identifying step as a mark on said output device in said display color.

2. The method of claim 1, further comprising the step of interpolation, wherein additional actual points are identified between two actual points, said additional actual points selected from points comprising a straight line segment between said two actual points.

3. The method of claim 1, wherein the parametric curve is a Bezier curve.

4. the method of claim 1, wherein the parametric curve is a B-spline curve.

5. The method of claim 1, wherein u is equal to a unit distance.

6. The method of claim 1, wherein u and v are equal.

7. The method of claim 1, wherein said output device is a video monitor, wherein said mark is a pixel, and wherein u is a distance between two closest horizontal pixels on said video monitor and v is a distance between two closest vertical pixels on said video monitor.

8. The method of claim 1, wherein said output device is a printer, wherein said mark is a dot on a printed page, and wherein u is a minimum horizontal dot spacing distance of said printer and v is a minimum vertical dot spacing distance of said printer.

9. The method of claim 1, wherein said plurality of t values comprises integer multiples of 1/16 from 0 to 1.

10. The method of claim 1, wherein said plurality of t values is determined by querying an input device.

11. The method of claim 1, wherein said plurality of t values is predetermined.

12. The method of claim 1, wherein said display color is selected as part of an initialization procedure and said display color is different from a background color.

13. The method of claim 1, wherein said x and y coordinates define an orthogonal two-dimensional vector space.

14. An apparatus for displaying a representation of a parametric curve, the parametric curve characterized by points with x and y coordinates satisfying a first equation, $x=f(t)$, and a second equation, $y=g(t)$, for at least one value of t, t being a real number within a predetermined range bounded by a first t value and a last t value, where f and g represent predetermined functions of t, and where x and y coordinates uniquely identify a location of a point in a two-dimensional space, the apparatus comprising:

an output device characterized by a finite resolution, said finite resolution represented by grid spacing distances u and v, said grid spacing distances determined from a resolution of said output device such that each grid point capable of being displayed as a mark by said output device is characterized by x and y coordinate values which are integer multiples of u and v, respectively;

first selecting means for selecting a plurality of t values within the predetermined range;

first calculating means coupled to said first selecting means, for calculating a location of an actual point for each t value of said plurality of t values, said location comprising an x and y coordinate of said actual point calculated from the first equation and the second equation, respectively;

grid line selection means coupled to said first calculating means, for selecting a grid line for each actual point, said grid line described by a third equation, $x=p*u$, when an absolute value of a derivative of g(t) with respect to f(t) at said each t value is less than one and described by a fourth equation, $y=q*v$, when said absolute value is greater than one, wherein p and q are integers resulting from rounding said x and y coordinates of said actual point to nearest integer multiples of u and v, respectively;

cross point locating means coupled to said first calculating means and said grid line selection means, for locating a cross point for said each actual point, said cross point being an intersection of said grid line selected for said each actual point and a tangent to the parametric curve, where said tangent passes through said each actual point;

grid point locating means coupled to said grid line selection means and said cross point locating means for locating a grid point on said grid line nearest said cross point for each actual point, wherein grid points are characterized by x and y coordinates which are integer multiples of u and v, respectively;

means for selecting a display color; and means coupled to said grid point locating means, said output device, and said means for selecting a display color, for indicating a location of each grid point located for each t value in said plurality of t values and a display color to said output device, wherein said output device displays said grid point as a mark on said output device in said display color.

15. The apparatus of claim 14, further comprising means for interpolation which identifies additional actual points between two actual points, said additional actual points selected from points comprising a straight line segment between said two actual points.

16. the apparatus of claim 14, wherein said output device is a video monitor, wherein said mark is a pixel, and wherein u is a distance between two closest horizontal pixels on said video monitor and v is a distance between two closest vertical pixels on said video monitor.

17. the apparatus of claim 14, wherein said output device is a printer, wherein said mark is a dot on a printed page, and wherein u is a minimum horizontal dot spacing distance of said printer and v is a minimum vertical dot spacing distance of said printer.

18. the apparatus of claim 14, further comprising means for user selection of said display color and a background color.

* * * * *